United States Patent [19]

Walsh

[11] Patent Number: 4,836,932

[45] Date of Patent: Jun. 6, 1989

[54] WATER TREATMENT USING FINE PARTICLE SUPER MAGNETS

[75] Inventor: John V. Walsh, Glendora, Calif.

[73] Assignee: Micro Magnetics, Inc., Newport News, Va.

[21] Appl. No.: 64,505

[22] Filed: Jun. 22, 1987

[51] Int. Cl.[4] .............................................. B01D 35/06
[52] U.S. Cl. .................................... 210/695; 210/223; 335/303; 335/306
[58] Field of Search ...................... 210/695, 222, 223; 335/312-306

[56] References Cited

U.S. PATENT DOCUMENTS

| | | | |
|---|---|---|---|
| 3,164,686 | 1/1965 | Tibbetts | 335/306 |
| 3,665,355 | 5/1972 | Sasaki et al. | 335/306 |
| 4,004,167 | 1/1977 | Meckling | 335/303 X |
| 4,147,632 | 4/1979 | Oden | 210/222 |
| 4,367,143 | 1/1983 | Carpenter | 210/222 |
| 4,560,484 | 12/1985 | Friedlaender et al. | 210/223 X |
| 4,580,121 | 4/1986 | Ogawa | 335/306 X |

OTHER PUBLICATIONS

Experimental Evidence for Effects of Magnetic Fields on Moving Water by Kalus J. Kronenberg, IEEE Transactions on Magnetics, vol. MA-21, No. 5, Sep. 1985.

On the Magnetic Treatment of Feed Water for Steam Boilers by H. Todoriyev and H. Yovchev, Foreign Technology Division, Air Force Systems Command, FTD-HC-1641-72.

Precipitation in a Beta-Brass-Fe-Alloy, Burkowitz, A. E. and Flanders, P. J., Journal of Applied Physics, Supplement to Vol. 1, 30, No. 4, Apr. 1959, pp. 111s, 112s.

Primary Examiner—Charles Hart
Attorney, Agent, or Firm—William W. Haefliger

[57] ABSTRACT

Described herein is an improved method for the fabrication and use in modifying the physicochemical properties of water, as in strong, high density gradient application. This new approach provides in situ devices capable of inexpensive and effective water modification and treatment. The underlying concept is based upon the use of fine particle super ferromagnets or super paramagnets dispersed in nonmagnetic media. These media can be materials such as brass, cellulose or a wide variety of ceramics. Nonaqueous applications include the removal of impurities from liquid polymer streams. Other applications involve pseudo polymers or fluids exhibiting weak inter- and intra molecular forces.

16 Claims, 3 Drawing Sheets

WATER TREATMENT USING FINE PARTICLE SUPER MAGNETS

BACKGROUND OF THE INVENTION

This invention relates generally to water treatment, and more particularly to a highly effective and improved water treatment cell producing a locally strong magnetic field.

The treatment of water to change water structure, by employing strong fields, is known. Such water structure modification is desirable for certain chemical processes one example being de-scaling.

Explanations relating to the performance of a magnetic water treatment can be complex and confusing. For example, simply placing a magnetic treatment cell in a glass aquarium will result in the precipitation of solids after a period of a few tens of hours. This simple experiment shows that the process is not galvanic since there is only one electrode in an insulated container. Additionally, it may be concluded that the process is usually quite slow, if the fields are weak and there is little or no flow velocity. Observation leads to the conclusion that the process begins in the region near the surface of the cell. Once started, the process continues in the bulk of the system.

Using currently accepted descriptions of the water molecule in the liquid state, several process mechanisms can be postulated. The water molecule is quite flexible and its electron configuration makes it a voracious seeker of other electrons with which it can share the many electron states of its neighbors in a liquid media. If it is assumed that an electron becomes trapped in the proximity of a weak magetic field, it can be presumed that the kinetic energy of the molecule is reduced. Consequently there is a reduction in solubility in the region near the cell. The reduction in solubility would free the elements from the water molecule. When in solution, the ions which join with other released elements crystallize or agglomerate. This process would account for the finely divided residue observed in most cell experiments. An additional effect can be postulated which may coexist with the concept of the magnetic field effecting the covalent electrons in water. The normal autoionization results in a pH of seven. The equilibrium pH in most treated systems ranges from 8.5 to 11. This implies a reduction in hydronomium (OH=) ions. A postulated cause and effect relates to another interaction between electrons in the water macro molecule i.e., approximately $6H_2O$ per effective molecule. If this interaction would cause a local reduction in the kinetic energy, more contaminant ions would be made available to react or possibly break away from the macro molecule taking with it the ion in solution. Once removed from the region of the cell, some water molecules rejoin, releasing their ions to agglomerate or crystallize. The net effect would be the observed increase in the system pH.

One type of water structure change is produced by the known Zeeman splitting effect, in weak magnetic fields.

In the past, brass tubes have been silver plated and filed with magnetite. Problems with this type of water treatment cell include the fact that the cell is too thick to provide a sufficiently high gradient field; the silver coating contains no diluent, and the magnetic field quickly degrades or disappears in use.

There is need for improved and simple methods and devices such as cells capable of inexpensively modifying and treating water.

SUMMARY OF THE INVENTION

It is a major object of the invention to provide improved methods and devices meeting the above need and wherein minute highly intense magnetic fields are produced, with stabilization of micro-magnet geometry. Such devices and methods are characterized by the employment of fine particles dispersed in nonmagnetic media such as brass, copper, uranium, ceramics or cellulose. A typical device for magnetic treatment of water will comprise, in combination:

(a) a non-magnetic solid matrix, and
(b) magnetic particles dispersed in said matrix, said particles selected from the group that includes:
 (i) super ferromagnets
 (ii) super paramagnets It is another object of the invention to provide such particles in the form of agglomerations of unit particles, the agglomerations being elongated to have lengths between 10 and 20 times the length of the unit particles, to produce more effective results. The unit particles themselves typically comprise sub-particles about 1,000 Angstroms in length, and agglomerated to form unit particles. See Subsequent description.

It is another object to provide a matrix for the dispersed, elongated agglomerations of unit particles, in the form of metal such as brass, copper or uranium, or ceramic such as zirconia or alumina. Typically matrix forms a duct or ducts in which the water or other liquid to be treated may flow. In this regard, it is contemplated that the device of the invention may be employed in nonaqueous applications such as the removal of impurities from liquid polymer streams.

These and other objects and advantages of the invention, as well as the details of an illustrative embodiment, will be more fully understood from the following specification and drawings, in which:

DRAWING DESCRIPTION

DETAILED DESCRIPTION

The invention employs uniform magnetic particles such as those provided by attrition mill grinding that provide optimum field strengths. These magnets are enhanced by being formed in collinear magnet structures. These structures are provided or dispersed in a carrier matrix such as brass or appropriate quenching. See "Precipitation in a Beta-Brass-Fe Alloy", Burkowtiz, A. E. and Flanders, P. J., Journal of Applied Physics, Supplement to Vol. 30, No. Apr. 4, 1959, pp. 111s, 112s.

Figure 1:
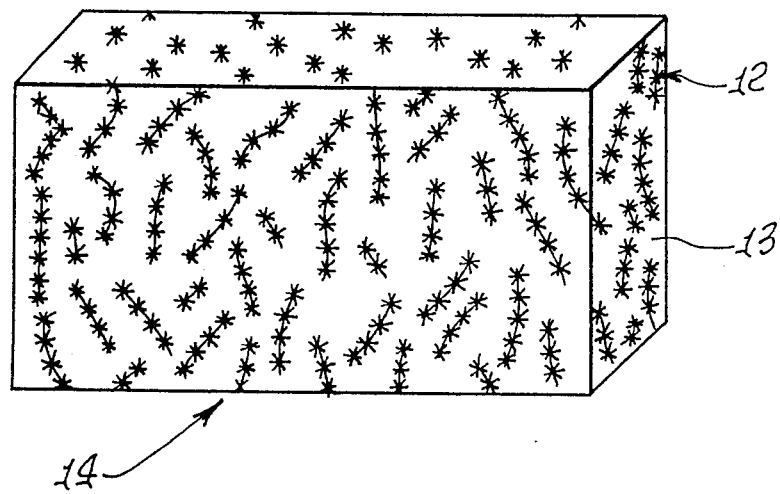
FIG. 1 is a perspective view of a bar device incorporating the invention.

The addition of a typical particulate material such as powdered magnetite to brass in dilution of approximately 1 to 10 percent by weight yields super magnetic fields that range from 60 to 250 Testla (60,000 to 250,000 gauss). The magnets that yield these fields are comprised of unit particle magnets approximately 1000 Angstroms in length and agglomerated to a coolinear length of 24,000 Angstroms (2.4 microns). FIG. 1 shows such collinear elements 12 dispersed in a brass matrix 13, and forming a bar.

The following tables illustrate various usable ferromagnetic materials:

TABLE 1

SATURATION MAGNETIZATION AND CURIE POINTS OF SOME SIMPLE FERRITE SPINELS[a]

| Ferrite | X-ray density | 4 $M_s$ at room temperature | $t_c$, °C. |
|---|---|---|---|
| $MnFe_2O_4$ | 5.00 | 4,900[c] | 295–330[c,d] |
| $Fe_3O_4$ | 5.24 | 6,000[b] | 585[b] |
| $CoFe_2O_4$ | 5.29 | 5,300[b] | 520[b] |
| $NiFe_2O_4$ | 5.38 | 3,230[c] | 580–600[c,d] |
| $CuFe_2O_4$ | 5.35 | 1,700[b,e] | 455[b] |
| $MgFe_2O_4$ | 4.55 | 1,450[c,e] | 320,440[c,d,e] |
| $CdFe_2O_4$ | — | 0 | |
| $ZnFe_2O_4$[f] | 5.33 | 0 | 60 |
| $Li_{0.5}Fe_{2.5}$ | 4.75 | 3,240–3,900[c,d] | 590–680[c,d] |

[a]Prepared by F. G. Brockman Philips Laboratories, Briarcliff Manor, N.Y.
[b]J. Smit and H. P. J. Wijn, "Ferrites," John Wiley & Sons, Inc., New York, 1959
[c]Wilhelm H. von Aulock, ed., "Handbook of Microwave Ferrite Materials." Academic Press, Inc., New York, 1965
[d]Range of values indicates extremes of reported values from various workers.
[e]Depends on heat treatment.
[f]$ZnFe_2O_4$ magnetic when quenched, otherwise nonmagnetic; $t_c$ for rapid quencer

TABLE 2

BOHR MAGNETRON NUMBERS OF SOME FERRITE SPINELS AND OF CORRESPONDING SOLID SOLUTIONS WITH $ZnFe_2O_4$[a]

| Mol % $ZnFe_2O_4$ | 0 | 20 | 40 | 50 | 70 |
|---|---|---|---|---|---|
| $MnFe_2O_4$[b] | 4.5 | 5.6 | 6.7 | 7.0 | 6.3 |
| $FeFe_2O_4$[c] | 4.2 | 5.2 | 5.7 | 5.8 | 5.4 |
| $CoFe_2O_4$ | 3.7 | 5.0 | 6.1 | 6.3 | 5.2 |
| $NiFe_2O_4$ | 2.4 | 3.8 | 5.1 | 5.3 | 5.1 |
| $MgFe_2O_4$ | 1.8[d] | 3.3[d] | 4.2[d] | 4.4[d] | 4.2[d] |
| $(Li_{0.5}Fe_{0.5})Fe_2O_4$[c] | 2.6 | 2.8 | 4.4 | 4.0 | 1.8 |
| $CuFe_2O_4$[c] | 1.3[d] | — | — | 4.7[d] | |

[a]Prepared by F. G. Brockman, Philips Laboratories, Briarcliff Manor, N.Y. Some values obtained by interpolation of data in references.
[b]C. Guillaud et al., from summary of E. W. Gorer.
[c]E. W. Gorter, Philips Research Repts. 9, 295, 321, 403
[d]Depends on heat treatment.

While a large number of ferromagnetic materials and spinels can be used (see above Tables 1 and 2 for examples) it should be noted that all such magnets have essentially common requirements. Particles must be generally uniform in size and be agglomerated in a collinear manner up to 10 and 20 times the unit particle length. Very long magnetic agglomerates tend to form torroids or spinel assemblies with resulting loss of external field strength. Typical collinear lengths can range in length from 10 to 100 microns with unit particles sizes of 2 to 20 microns. A typical unit length for magnetite is 2.4 microns.

Figure 2:
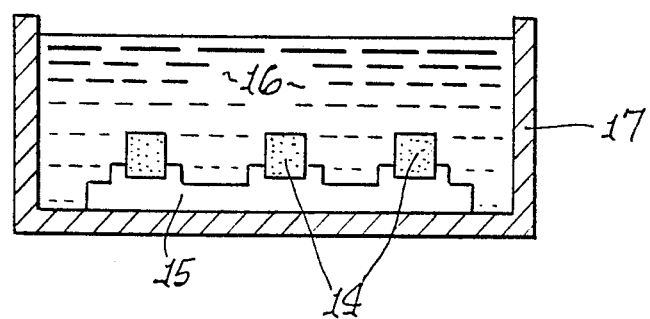
FIG. 2 is a view of the use of the FIG. 1 device to treat liquid.
Figure 3:
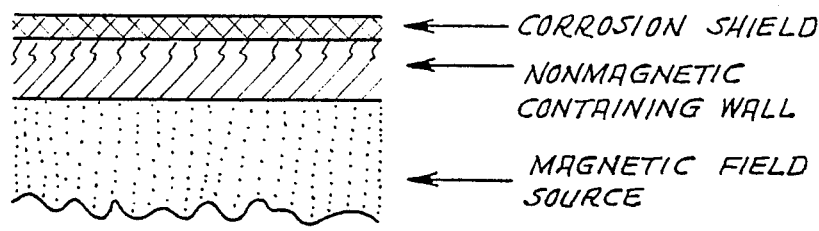
FIG. 3 is an enlarged section showing construction of a composite device.

Addition of a means of maintaining the required magnet distribution is also contemplated. If the device consists of magnetic powder encased in a thin brass container, the magnet separation can be achieved by dilution with cellulose, polysucrose, or fine ceramic powder. In the case of ceramic matrices, high oxygen-containing materials such as zirconia or alumina work best since oxygen has no gyromagnetic ratio and is totally nonmagnetic. Three basic configurations which meet the necessary physical requirement to provide an effective device, are: (FIG. 1) super magnets alloyed in nonmagnetic material such as brass, a super-magnetic material such as brass, a super-magnetic material mixed in a non-magnetic material mixed in a non-magnetic ceramic, and a dispersed super-magnetic material encased in a thin non-magnetic housing (FIG. 3). FIG. 2 shows bars 14, as in FIG. 1, on a support 15, located in a water bath in a vessel 17, to treat the water. In FIG. 3, the undiluted supermagnetic material 30 is encased in a wall or housing 31, and a a corrosion resistant shield 32 is laminated over wall 31; water to be treated appears at 32. Thicknesses and materials are listed as follows, with the understanding that the sum of the thicknesses of 31 and 32 is equal to or less than 0.035 inches.

| | material | thickness range (inches) | preferred thickness (inches) |
|---|---|---|---|
| 30 | magnetite | variable | variable |
| 31 | brass | .032(max) | .025 |
| 32 | silver | .010(max) | .004 |

FIG. 2 shows a bar 14, as in FIG. 1, carried on a support 15 located in a water bath 16 in a vessel 17, for treating the water. For example, minerals such as ionized calcium in the water precipitates out as calcium powder, at the bottom of the bath in the vessel.

Many applications or uses for the invention exist. Generally speaking, they relate to processes which become effective as the result of (1) the modification of water; (2) reactions accelerated by the addition of seeding compounds; and (3) reactions which proceed with magnetic fields as an intermediate. For example hazardous waste minerals can be removed by saturating the contaminated stream with $CO_{24}$. Oil and solids from contaminated streams have been successfully removed from waste water.

Figure 4:
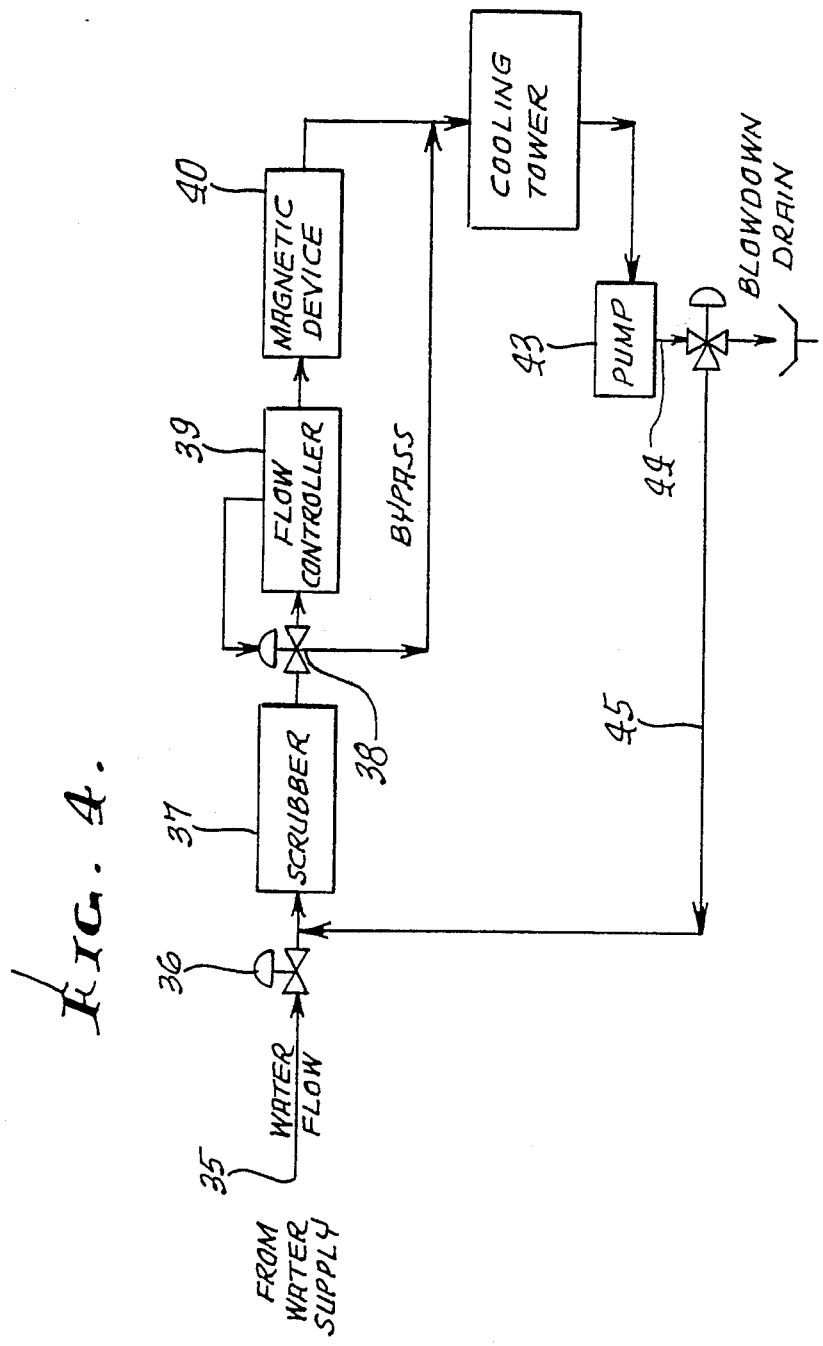
FIG. 4 is a system diagram.

FIG. 4 illustrates a cooling tower water treatment process employing a magnetic device 40 such as a water passing tube or tubes having the composition as described in connection with FIG. 1. Warm supply water 35 is passed via valve 36 to scrubber 37 that removes larger particles (sized 10 microns and larger). The effluent from the scrubber is then passed via valve 38 and flow controller 39 to the device 40 of the invention, for treatment (de-scaling, etc.). The effluent is then passed at 41 to the cooling tower 42 for cooling of the water stream. A pump 43 delivers the water at 44, one portion 45 returned to the scrubber, and another portion flows to drain 46, for subsequent use.

Contained within the schematic of FIG. 4 is a provision to prevent or correct a condition of chemical equilibrium. This can be accomplished by replacing all or a portion of the system water (blowdown) or filtering and back-flushing as is common in swimming pools. Similarly, accumulated solids can be removed. Pump 43 provides sufficient flow to maintain a turbulent flow in the region of the magnetic device. Turbulent flow is that defined as having a Reynolds number (Re) greater than 4000. Additionally it may be necessary to adjust flow controller 39 to prevent overuse of the magnetic element. Should the process stream achieve unstable conditions as a result of overtreatment, the active element is effectively removed or limited by limiting or controlling the amount of water in contact with the magnetic device.

Figure 5:
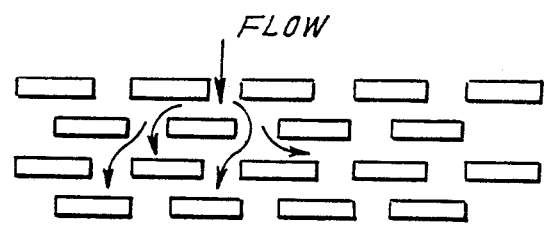
FIGS. 5-7 are views showing different configurations of devices incorporating the invention, arrayed in liquid flow streams.
Figure 6:
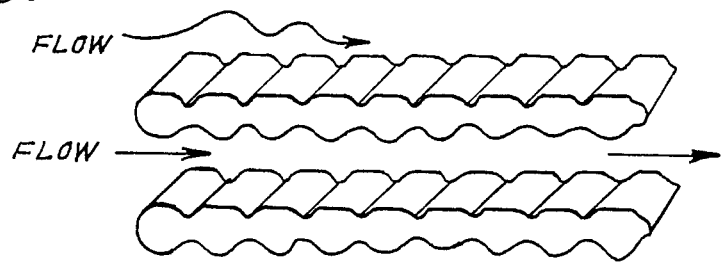
Figure 7:
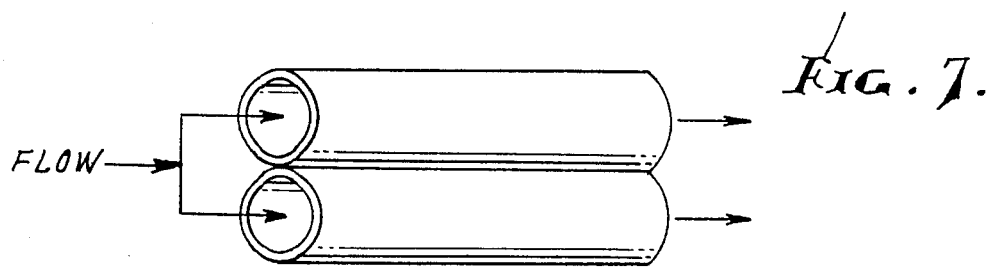

Scrubbers 37 are used under some conditions. The damaging or the inhibiting of beneficial reactions may result from substances which may interactively interfere with or damage the device or its function. Examples of this would be the presence of fluoride or chloride ions. This can be achieved by chemical scrubbers, adsorbers, molecular sieves, etc. FIG. 5-7 illustrate various configurations of the solid material of a composition as described above, as for example is illustrated in FIG. 1, for treating flowing water. Bars 14 are arranged in staggered conformation in FIG. 5 to provide tortuous water flow paths 50. In FIG. 6, the bars 14a are elongated in the directions 51 of water flow, and the bars have corrugated sides 52 facing the flow to produce turbulent water flow, as is also produced by the staggered bars in FIG. 5. Tubes made of the FIG. 1 material are shown at 55 in FIG. 7, for weak magnetic field treatment of water flowing in direction 56 through the tubes.

The principle characteristics of the improved devices are as follows:

1. Fabrication of high efficiency field super ferromagnets/super paramagnets dispersed in nonmagnetic media i.e. brass/cellulose.

2. Uniform small super magnets for optimum field strengths are provided with collinear magnet structures, and comprised of unit particle magnets approximately 1000 Angstroms unit length and agglomerated to a collinear length of 24,000 Angstroms (2.4 microns).

3. Collinear fields are provided by materails which consists of fine ferromagnets or paragmagnetic material.

4. Particles are uniform in dimension and collinear to preserve field strength. Long magnetic agglomerate tends to form toroids with total loss of external fields, i.e. typically with a length of 10–1000 microns. Optimal length will range from 2 to 20 microns as a function of material selection e.g. 2.4 microns for magnetites; or those lengths which will retain collinearity.

5. A matrix is provided to maintain required distribution and separation of ferromagnet/paramagnetic agglomerates.

6. Devices are formed by dissolving ferro/paramagnetic materials in a nonmagnetic media, i.e., brass, uranium, or copper. Appropriate magnetic structures are formed by appropriate metallurgical processes, i.e., quenching of magnetite in brass.

7. Devices are also formed by distributing fine particle supermagnets in ceramics such as, zirconia or alumina.

I claim:

1. In a device useful for magnetic field treatment of water, the combination comprising:
   (a) a non-magnetic solid metallic material matrix, and
   (b) magnetic particles dispersed in said matrix, said particles selected from the group that includes:
      (i) super ferromagnets
      (ii) super para magnets,
   (c) said particles being elongated and comprising agglomerations of unit particles, the unit particles comprising sub-particle magnets about 1,000 Angstroms in length and agglomerated to form said unit particles, the agglomerations having lengths that are between about 10 to 20 times the lengths of the unit particles, said lengths being between about 10 to 100 microns, and the unit particles having sizes between about 2 and 20 microns, the metallic material extending between said elongated agglomerations.

2. The combination of claim 1 wherein said sub-particle magnets consists of magnetite.

3. The combination of claim 1 wherein said matrix is a metal selected from the group of non-ferrous materials that includes:
   ($x_1$) brass
   ($x_2$) copper
   ($x_3$) uranium.

4. The combination of claim 1 wherein said matrix forms a path in which water flows.

5. The combination of claim 4 including a pump and a blowdown drain connected in series with said path.

6. The combination of claim 5 including a flow regulator connected in series with said path.

7. The combination of claim 4 including a scrubber connected in series with said path.

8. The combination of claim 4 wherein said path has a conformation to produce turbulent flow.

9. The combination of claim 8 wherein said path has tortuous conformation defined by multiple of said matrices in a staggered array.

10. The combination of claim 8 wherein said path is defined by matrix walls which have corrugated conformation.

11. The method of treating liquid which includes:
    (a) providing a non-magnetic solid material matrix and magnetic particles dispersed in the matrix,
    (b) and exposing said liquid to magnetic fields produced by said particles,
    (c) said particles being elongated and comprising agglomerations of unit particles, the unit particles comprising sub-particle magnets about 1,000 Angstroms in length and agglomerated to form said unit particles, the agglomerations having lengths that are between about 10 to 20 times the lengths of the unit particles, said lengths being between about 10 to 100 microns, and the unit particles having sizes between about 2 and 20 microns, the metallic material extending between said elongated agglomerations.

12. The combination of claim claim 11 wherein said matrix is ceramic.

13. The combination of claim 12 wherein said ceramic is selected from the group that icludes:
    ($x_1$) zirconia
    ($x_2$) alumina.

14. The method of claim 11 including flowing the water turbulently adjacent said matrix.

15. The method of claim 11 including scrubbing the flow to remove particulate therefrom.

16. The method of claim 11 including pumping the flow, and removing particulate therefrom by blowdown.

* * * * *